US008438551B2

(12) United States Patent
Tonkin et al.

(10) Patent No.: US 8,438,551 B2
(45) Date of Patent: May 7, 2013

(54) CODE TRANSFORMATION

(75) Inventors: Albert Donald Tonkin, Seaforth (AU);
Ruth Emma Tonkin, Queenscliff (AU)

(73) Assignee: CSC Technology Singapore Pte Ltd,
Singapore (SG)

( * ) Notice: Subject to any disclaimer, the term of this patent is extended or adjusted under 35 U.S.C. 154(b) by 1217 days.

(21) Appl. No.: 11/993,668

(22) PCT Filed: Jun. 27, 2006

(86) PCT No.: PCT/AU2006/000892
§ 371 (c)(1),
(2), (4) Date: Nov. 6, 2008

(87) PCT Pub. No.: WO2007/000015
PCT Pub. Date: Jan. 4, 2007

(65) Prior Publication Data
US 2009/0064091 A1 Mar. 5, 2009

(30) Foreign Application Priority Data

Jun. 27, 2005 (AU) ................................. 2005903390
Oct. 7, 2005 (AU) ................................. 2005905559
Oct. 19, 2005 (AU) ................................. 2005905868

(51) Int. Cl.
*G06F 9/45* (2006.01)

(52) U.S. Cl.
USPC ............ 717/144; 717/137; 717/143; 717/154

(58) Field of Classification Search ........................ None
See application file for complete search history.

(56) References Cited

U.S. PATENT DOCUMENTS 6,745,384 B1 6/2004 Biggerstaff
2005/0273772 A1* 12/2005 Matsakis et al. .............. 717/136

FOREIGN PATENT DOCUMENTS
WO WO 02/093367 11/2002

OTHER PUBLICATIONS

John V. Harrison et al. "Legacy 4GL Application Migration Via Knowledge-Based Software Engineering Technology: A Case Study", p. 70-78.

* cited by examiner

*Primary Examiner* — Chuck Kendall

(57) ABSTRACT

The invention concerns the transformation of executable code from one language to another. In particular, the invention concerns the automated transformation of code. The invention concerns methods, software and computer systems for the creation of a tree comprised of nodes to be used in the transformation of code. The invention also concerns the methods, software and computer systems for the building of a parser to be used in the transformation of code. Finally, the invention also concerns an automated and iterative method of transforming, assessing and re-transforming code. The invention is advantageous in its ability to avoid usage of an intermediate transformation language, and its high level of automation that reduces manual transformation and accordingly is more efficient and less costly.

26 Claims, 13 Drawing Sheets

CODE TRANSFORMATION

TECHNICAL FIELD

The invention concerns the transformation of executable code from one language to another. In particular, the invention concerns the automated transformation of code.

BACKGROUND OF THE INVENTION

A legacy system is an antiquated computer system or application program that usually contains billions of lines of code that have been written in COBOL, PL/I and other old programming languages.

Transformation refers to the process by which legacy application source code is changed into modern languages eg. Converting an application from COBOL to Java on J2EE, or an application written in RPG to C# on .NET. Transformation is sometimes also called modernisation.

There are many advantages to transforming a legacy applications into independent, contemporary technology platform:
  intellectual property in legacy applications is maintained;
  future modifications to the application will be easier and less costly;
  the application can be modernised to offer Web-enablement; and
  the application can retain the original look, feel and functionality to minimise employee training.

Transformation often utilises a workbench based approach to application modernisation, that is, transformation based on a set of disparate tools, and often involves significant manual translation of the code.

A Terekhov and C Verhoef state in their paper entitled "The Realities of Language Conversions" (St Petersburg State University) that automated language conversion appears deceptively simple, when in fact it is a very complicated problem. They conclude by stating that there is no such thing as an easy conversion and that people should limit their expectations on both the quality and the semantical equivalence of conversion projects.

SUMMARY OF THE INVENTION

In a first aspect the invention is a method of creating a tree comprised of nodes to be used in the transformation of executable code to a different programming language, the method comprising:
  receiving the executable code;
  identifying each executable segment of the code;
  assigning each executable segment of the code a node, wherein each node is one of a set of predetermined nodes types that each define a unique generic executable operation of programming languages, the structure and content of each node is determined by the generic operation that the node type defines; and
  linking nodes to create the tree.

By reducing each executable segment to its basic meaning, the syntactical differences of each language are not reflected in the created tree that is then used to transform the code to a different programming language. Two sections of code would produce the same tree if they performed the same set of executable operations despite being written in different languages. In this way, the transformation of code is made easier as the same method can be applied to multiple programming languages and the need for an independent intermediary language is avoided.

The unique generic executable operation may be:
  a reference to another code component;
  an assignment statement;
  data manipulation statement;
  a conditional statement; or
  a loop statement.

For each node type, the structure may comprise one or more sub-nodes, wherein each sub-node is a set of predetermined, sub-node types that each define a possible component of the generic executable operation.

For example, a node type defining the executable operation of an assignment statement may be structured to comprise a first sub-node of a sub-node type that defines the target component of the assignment operation, and a second sub-node of a node type that defines of the assignment value component of the assignment operation.

For each sub-node type, the structure may comprise one or more further sub-nodes, wherein each further sub-node is a set of predetermined further sub-node types that each define a possible sub-component of the component of the generic executable operation.

For example, the above second sub-node may have a set of predetermined further sub-node types that includes a further sub-node the defines a variable or an arithmetic expression.

In the tree, a variable used in the executable code will appear in the tree associated with a sub-node type that defines a variable.

In the tree, a mathematical equation used in the executable code will appear in the tree associated with a sub-node type that defines a mathematical expression used in the equation.

In the tree, a constant that is used in the executable code will appear in the tree associated with a sub-node type that defines a constant.

Each node may include identification information, such as a line number of the executable segment within the executable code that was assigned to it.

Each node is linked to the tree by assigning to the node linking information regarding other nodes that are required to link the node to the tree, such as details of the node's parent node and child node(s).

Each node may have a unique identifier. A node may be linked to the tree by having the unique ID of the parent or child node(s) associated with the node.

Each node may further comprise methods on how to perform various actions that aid the manipulation of tree.

Each node may further comprise a marker that may be used by the various methods that aid the manipulation of tree; such as to indicate that a method has been performed on that node.

The method may further comprise:
  receiving declarative data associated with the executable code;
  identifying each declarative segment of the declarative data;
  assigning each declarative segment of the code a node that is a node type that defines a declaration; and
  linking the declaration node to the tree.

The declarative data may be further code associated with the executable code. The declaration data may comprise a variable declaration, a function declaration or a program declaration.

The declaration node may comprise any one or more of:
  identification information as described above;
  linking information as described above;
  methods as described above; and
  an unique identifier.

In a second aspect, the invention comprises a method of building a parser to create a tree comprised of nodes to be used in the transformation of executable code from a first programming language to a second programming language, the method comprising:

identifying for the first programming language, the syntax of code written in the first programming language that defines an executable operation;

assigning the identified syntax a node type, wherein each node type is one of a set of predetermined nodes types that each define a unique generic executable operation of programming languages; the structure and content of each node type is determined by the generic operation that the node type defines;

repeating the method until the syntax for all executable operations of the first operating language have been identified and assigned a node type.

In a third aspect the invention provides a parser to perform the method of the first aspect of the invention. This parser may be built according to the method of the second aspect of the invention.

In a fourth aspect the invention is application software able to operate a computer system to perform the method of the first aspect of the invention.

In a fifth aspect the invention is application software able to operate a computer system to perform the method of the second aspect of the invention.

In a sixth aspect the invention is a computer system for transforming executable code to a different programming language, the computer system having:

input means to receive the executable code;

storage means to store the received code and application software; and processing means to use the application software to perform the method of the first aspect of the invention.

The computer system may further comprise output means to output the executable code in the different programming language.

In a seventh aspect the invention is a computer system for transforming executable code from a first programming language to second, the computer system comprising:

storage means to store the executable code and application software; and processing means to use the application software to perform the method of the second aspect of the invention.

In an eighth aspect, the invention comprises a method of transforming executable code from a first programming language to a second programming language, the method comprising:

creating a tree as described in the first aspect of the invention;

for each node on the tree, transcribing the executable operation defined into the syntax of the second programming language.

In a ninth aspect the invention is a method of transforming code to a different programming language, the method comprising:

receiving the code;

creating an abstract syntax tree based on the executable code;

storing on a data store identification data on a plurality of re-structuring processes to be run on the abstract syntax tree to re-structure the tree to aid the transformation of the code to the different language;

automatically running the re-structuring processes identified in the data store on the abstract syntax tree;

automatically running a deployment process on the restructured tree to transform the code to the different programming language;

assessing the transformed code and based on this assessment identifying a further re-structuring processes to be run on the abstract syntax tree to aid the transformation of the code to the different language;

storing on the data store identification data of the further re-structuring process; and repeating the running steps.

The original code is repeatedly transformed and analysed with each iteration making the transformed code better in quality and more maintainable. Each iteration produces transformed code that is more compatible and compliant with the architecture of the new language.

This iterative solution to code transformation is only possible given the high level of automation in the transformation process. If manual data transformation was included in the running steps, the cost and effort of an iterative solution to obtain the best code possible would be prohibitive. Further, by performing those processes identified in the data store, the transformation can be dynamically redefined between iterations.

The code may be received from the owner of the code. The method may also include receiving a data dictionary, meta data, or any other documentation that related to the received code.

The abstract tree may be the tree described in accordance with the first and second aspects of the invention. The abstract syntax tree may be created using the method described in the first aspect of the invention.

The method may further comprise the step of storing the abstract syntax tree in the data store.

The step of creating the abstract syntax tree may further comprise extracting declarative elements from the abstract syntax tree and storing it to the data store. The declarative elements may be extracted from the abstract syntax tree using a plurality of mining processes that mine the abstract syntax tree to identify declarative elements in the tree. Attributes of each of the declarative elements may also be stored in the data store.

The method may also comprise storing in the data store analytical data on how and where elements of the code are used.

The step of converting the code into an abstract syntax tree may further comprise storing to the date, store the abstract syntax tree.

The method may further comprise the step of storing to the data store metadata about the code. The metadata may be manually written to the datastore. The metadata may include information about the original language of the code and/or the different programming language. This may include information about the "built-in" components of the original language of the code and/or the different programming language. The metadata may also include further information on the restructuring such as the required maintainability, run time complexity and efficiency of the transformed code.

Alternatively or in addition, the metadata may be extracted from the abstract syntax tree using a plurality of mining processes that mine the abstract syntax tree to determine the code's metadata.

The restructuring processes may include one or more of the following:

a process to identify loops and restructure to the desired loop architecture;

a process to identify particular executable statement and restructure to more sophisticated architecture;

a process to identify GOTO statements in the abstract syntax tree and restructure tree to remove them;

a process to identify duplicated sets of nodes in the tree and restructure to create the set of nodes as a function or procedure;

a process to identify the scope of one or more variables;

a process to identify a particular set of nodes in the abstract syntax tree and rearrange the structure of those nodes;

a process to identify a particular set of nodes in the abstract syntax tree and replace the nodes, such as with a function call;

a process to change the data structure into third normal form;

a process to walk the tree to identify interfaces; and a process to walk the tree and analyse the use of a variable to refine the variable type.

The method may further comprise writing the re-structuring process to be run on the abstract syntax tree.

The method may further comprising performing an audit of the information stored in the data store to identify whether information is missing.

The step of automatically running the re-structuring processes identified in the data store may also use declarative information and metadata information about the code stored to the datastore.

The processes may be run simultaneously.

The step of automatically running the deployment process may also use declarative information and metadata information about the code stored to the datastore.

The assessment of the transformed code may be based on an assessment of any one or more of:
cyclomatic complexity of the code;
number of lines of code;
number of processes that have been replaced;
manual assessment of the transformed code; and
accuracy of the deployed code.

The assessment of the transformed code may also be based on the abstract syntax tree.

The assessment of the transformed code may include the generation of exception reports that identify parts of the deployed code that may not operate as required.

Before assessing the transformed code, the method may include the step of storing the transformed code in the data store. This may involve replacing the transformed code of a previous iteration of the method with the newest version of the transformed code.

The data store of the invention may be the one data store.

In a tenth aspect the invention is application software able to perform the method according to the eighth aspect of the invention.

In an eleventh aspect the invention is a computer system programmed to perform the method of the eight aspect of the invention. The computer system for transforming code, the computer system having:
input means to receive the code;
storage means to store the received code and application software; and
processing means to use the application software to perform the method of the eighth aspect of the invention.

The computer system further comprises a data store to store the information described above.

BRIEF DESCRIPTION OF THE DRAWINGS

Best modes of the invention will now be described with reference to the accompanying drawings, in which.

BEST MODES OF THE INVENTION

Figure 1:
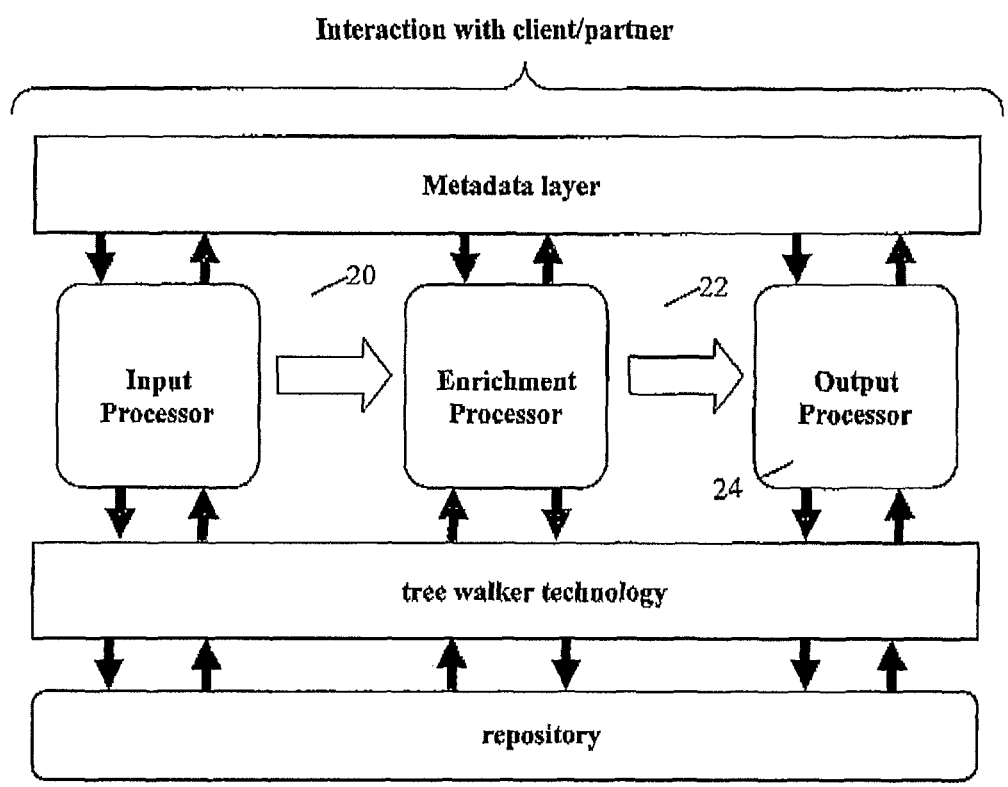
FIG. 1 is a schematic diagram of the components of the transformation system.

The method of one aspect of the invention comprises multiple steps that are repeated. Each iteration is aimed at producing the best quality and accurate deployed code possible. The iterations are only possible due to the automated tree restructuring and deployment. If these steps were done manually, it would be cost and time wise prohibitive to repeat steps of the transformation, even if a better method or a preferred result was identified. The iterative solution ensures that the best possible transformed code by improving it at every iteration. Further, should the requirements of the transformed code even though the deployment process has begun, then this is also possible In reference to FIG. 1, the components of the transformation system will now be described. The Transformation Engine is compartmentalised into three sets of serial processes which are performed iteratively.

The Input Processing component 20 lexes and parses the input language into a set of tokens and abstract logic trees. The tokens are applied to variables and to operators. Operator and variable are part of a developed wide spectrum language (WSL) which is effectively a superset of existing languages. All components are stored in a repository for simultaneous access by a number of processes.

The Enrichment processor component 22 stores the many processes that are performed by small code components called walkers which have the ability to traverse the Standard Trees and perform a number of tasks such as mining the tree for information, restructuring the tree and deploying the tree to another language. All restructuring is confined to Fermat Transforms which allow restructuring without changing functionality. An example of restructuring would be the recognition that a GO TO statement could be transformed to a DO WHILE statement depending upon other statements in the preceding execution sequence.

The Output processing component 24 walks the restructured Standard Trees and the repository to generate deployable code in the target language.

All processing can be performed on one or more processors of a computer system. The computer system will have installed software to enable the processor to perform the methods of the invention. The computer system will include input means to receive the code, such as CD drives able to receive CDs with the code stored thereon or able to receive portable hard drives that store the code. The computer system will also include suitable storage means to operate as the Quipoz repository (described in further detail below). The storage means will store for example, the software to perform the methods, the code to be transformed, and the code during transformation. The computer system may comprise separate computers all having processors on which the processing of this invention can be distributed across.

Walkers are aware of metadata requirements specified in a meta-data repository. This enables the transformation target to be dynamically redefined between iterations.

Figure 2A:
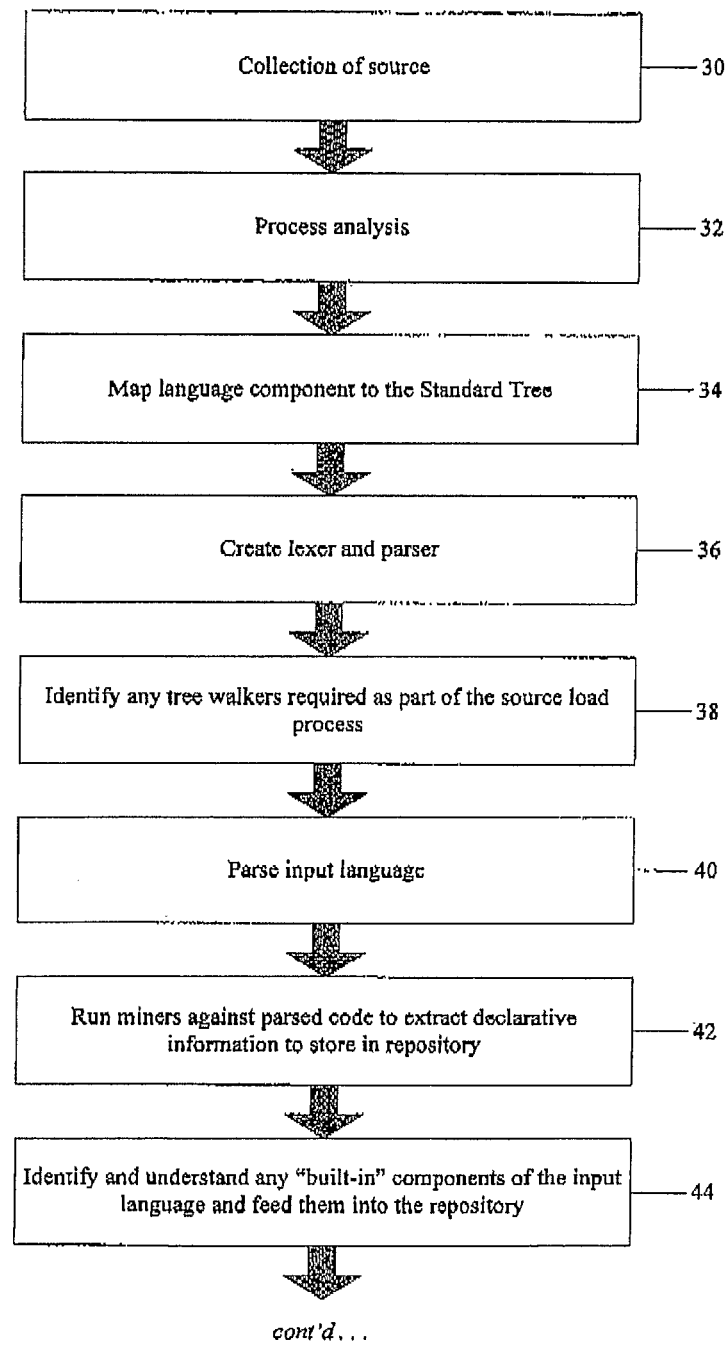
FIG. 2(*a*) to FIG. 2(*c*) is a flowchart of the technical processes of the invention.
Figure 2B:
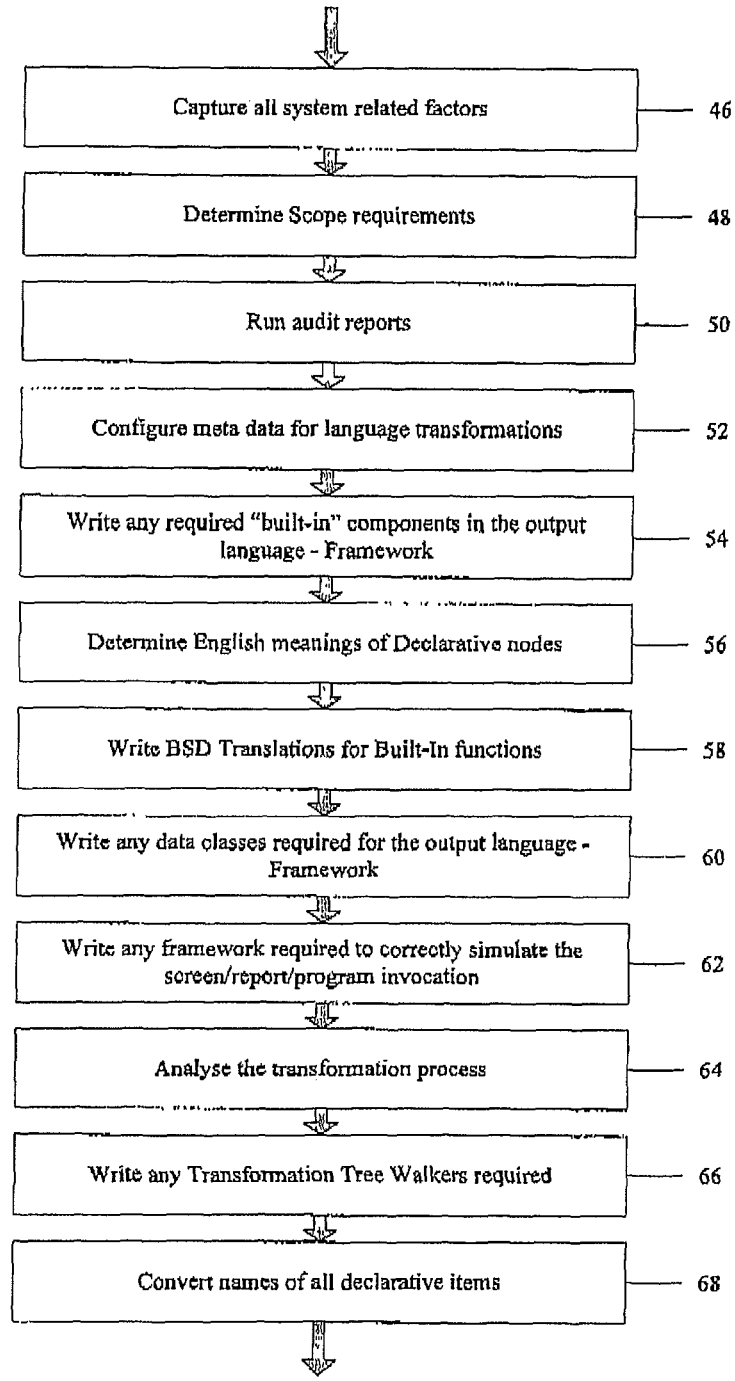
Figure 2C:
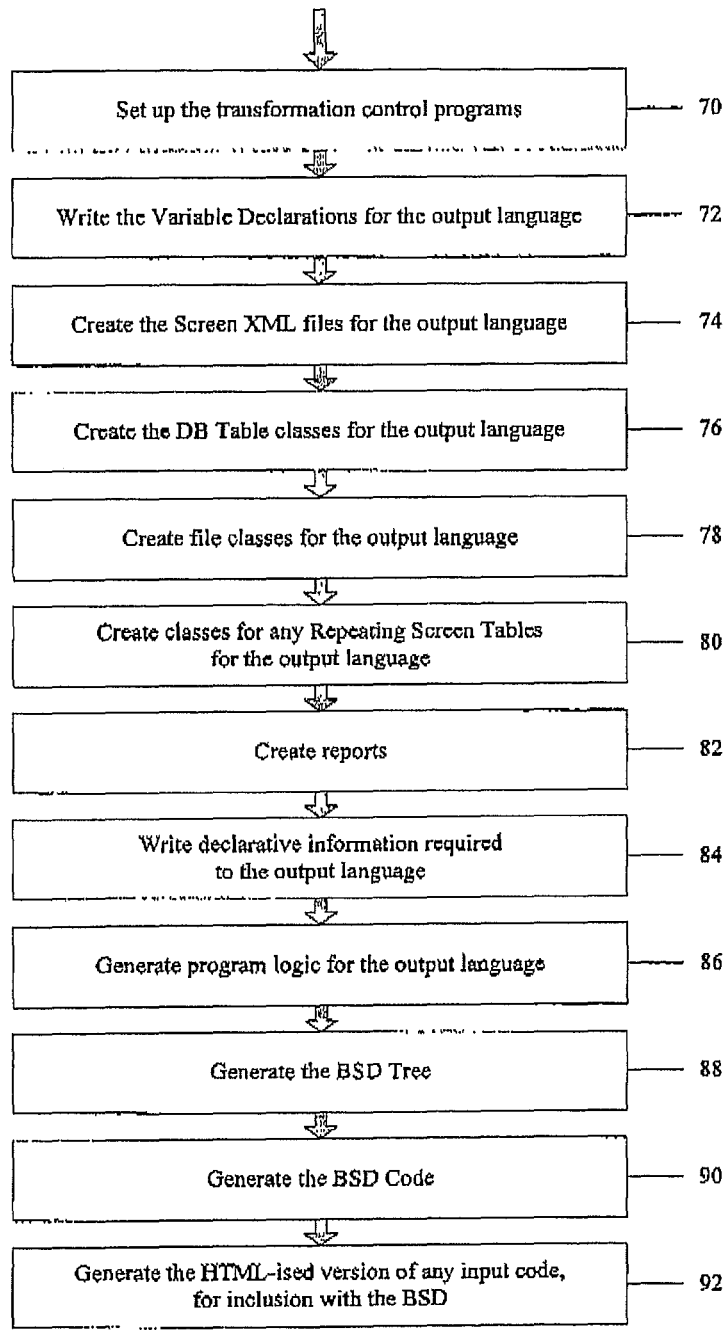

FIG. 2(a) to FIG. 2(c) is a flowchart of the technical processes that are used by the transformation system to transform an application. These processes achieve their purposes by employing the unique components that are described more fully below.

Initially, the source must be collected 30. Application source can be delivered to the transformation system in a variety of different formats. More common languages such as COBOL are fairly straight forward—these are received as one file per program, and each program will contain all of the information required for that program to operate: variable definitions, file relationships, etc. These are called "Program-Centric" languages.

Other languages, most particularly 4GLs, are not so simple. Typically, the coder will use an Integrated Development Environment, which consists of customised screens for entering data specific for one particular function only. The client will usually never see a single "Program"—rather a series of components. These cases can be challenging as the transformation must either use a program listing (which is inherently non-compileable, and often misses key relationship information, or has comments wandering through the code), or must attempt to decode the information held within a proprietary database. In either case, there is a lot of preliminary work. Often, all the variable definitions for all programs are stored in one file; all code for all programs is stored in another; all screen definitions in another and so on. This type of language is called ("Non Program Centric".

Information in both cases can also come from other sources. For instance, data dictionary files, even if they have not been kept up to date, can provide a lot of insightful information.

The next step in the process is the process analysis 32 where the materials received are analysed to determine upon a course of action. If the language to be transformed is non-program centric, then it is necessary to determine whether to use a program listing, or the proprietary database. Often, small test programs need to be given to the client for them to be run, so that the behaviour of the language in difficult situations can be determined.

It is at this stage, generally, that a properties file is set up for the particular transformation. Amongst other things, this contains metadata that tells the processes which language are being read in, to which language is the deployment, where to find the source code and which database to use.

The process analysis 32 almost always requires pre-processing for any project. For instance, if a program listing is being used as the source code, then pre-processing is required to remove page breaks and printer commands. In a few cases, pre-processing may be used to make use of a client's coding standards in order to better understand the language.

Most pre-processes are specific to a language and source format.

Next, each language component is mapped 34 to the Standard Tree. That is, each statement and declaration needs to be understood, and mapped to the corresponding item on the Standard Tree. For example, a statement in COBOL "MOVE A TO B" is simply an assignment statement, and will be mapped as such on the Standard Tree.

The Standard Tree will be discussed in further detail below.

A lexer and a parser is then created 36 for each language component. To speed up the process of writing a lexer and a parser, these items are generally written in a language called ANTLR. However, for screens for which the transformation system receives a graphic representation, rather than a coded one, this may not be the case.

While the lexer can be done at any time, the parsing, which parses the language and simultaneously builds the Standard Tree, cannot be done until the input language has been mapped to the Standard Tree. This is because the structure of the Standard Tree to be created changes the way in which the language is carved up. This is one of the key differences between the language parsers of the invention, and a standard language parser. A standard language parser simply recognises the input language, exactly as it comes in. Any tree which is created looks like that language. The invention, however, uses the parse step to identify each component, name it, and create the Standard Tree.

As an example, a comparison could be made between the tree produced when using a C parser that is freely available on the internet, and the one of the invention. Both are created using ANTLR, however, the trees that they build are drastically different.

The standard C parser, when it comes across a "(" in the input source, will classify this as a LEFT-PARENTHESIS node. The parser of the invention, however, digs deeper into the code, and determines whether this left-parenthesis is signifying a cast expression; demarking the beginning of a list of parameters to be passed to a function call; demarking a list of parameter declarations in a function declaration; or the beginning of a parenthesised expression in a mathematical equation. Further, the parser of the invention, once it has identified the role of that particular left parenthesis, will determine where in the current tree this item belongs—it may not be the same as where it is physically written in the C code.

Next, any Tree Walkers required as part of the source load process are identified 38. Occasionally, it is not possible for the parser to generate the Standard Tree completely. This is because the input language is so different from the Standard Tree in some particular areas, that it is considered too complex to map directly to the Standard Tree in one step. In such a case, Tree Walkers are created to do this.

These tree walkers are specific to the Input Source language, and cannot run with any other input language) as they are taking a tree in input-language format and turning it into the standard Standard Tree format.

An example of this is available in the RPG language. In the declarative section of an RPG program, parameters for subsequent program calls are stored in lists. Then in the logic section of the program, when there is a call to another program, these lists of parameters are invoked. The Standard Tree, however, requires that all parameters for a program call be associated with the program call itself. As this was too difficult to do at parsing time, a tree walker is employed after parsing, to pick up all the parameter lists, and put them in to the program call statements.

Once a language parser has been written, and all input tree walkers have been written, then it is simply a matter of running the parsers and tree walkers against all of the input source 40. This can be configured to run against all of the code, or simply specified items (controlled by InScopeItem).

The result of this step is that the input language has been translated into the Wide Spectrum Language (WSL), encapsulated by the Standard Tree.

Once the code has been parsed into Standard Tree format, the miners are run 42 against the parsed code to extract declarative information to store in the repository. Each miner walks the Standard Tree structure looking only for specific node types—always Declarative node types. For example, there is a miner that looks for all method declarations within a program; a miner that looks for all program calls; a miner that looks for any SQL statements.

These miners then store all declarative information on to the Repository. The Repository holds all Named items (e.g. variables), along with their attributes (e.g. length, input language data type, etc), and their relationship to other Named items (e.g. a function Fx1 OWNS a variable MyVar; a function Fx1 REFERENCES a DB Table ClientDetails).

Once this step is complete, then it can be said that the application has been loaded.

The next step is to Identify and understand any "built-in" components of the input language 44. This step does not need to be run here unless audit reports are to be produced.

It is necessary to identify any "built-in" components of the language—for instance, functions that are provided as part of the operating environment or the language. These are particularly common in 4GLs. They need to be identified before transformation, so that what has to be written is known. They also need to be identified before running any audit reports, so that it is apparent when a module is missing from the source, or whether it is a built in module that is provided by the source system.

Other items that need to be identified here are system constants and variables. For example, many languages provide some global variables—USERID, is an example. It can be used anywhere, but the programmer never has to declare them. This is because, like the functions, they are inherent in the system. An example of a global constant is the word SPACES in COBOL. Again, these need to be identified, and understood, so that the knowledge of how to transform them is recorded.

Once all of the built-in functions, variables and constants have been identified 44 they need to be inserted into the repository. Typically, this is done by creating a module with the name of the system (e.g. LINC_GLOBALS), and attaching all the functions, variables and constants to this module. Then, when any program within the system is processed, this global module is loaded into scope first, so that all its variables, functions and constants are available to the program.

All factors relating to the input system need to be captured and input 46 to the Repository. Information captured includes:
Compiler options;
Rounding options;
Word lengths;
Language options and
Code pages.

At this stage, how the scoping of items in a language works needs to be understood. Consider the differences between the following languages:

In language 1, a program OWNs a screen, and any variable that is shown on the screen is actually declared in the program, and the screen is simply allowed to use that variable. Therefore, there is only one definition of variable X. When program variable X is updated, the screen variable of X is automatically updated.

In language 2, screens are defined separately to programs, and screens contain their own variables. When a program decided to include a screen, the programmer then has to declare all the variables that the screen uses—therefore, there will be two declarations of variable X. In this case, a program variable with name X matches up with a screen variable with the name X.

Language 3 might be similar to language 2, but the programmer doesn't have to declare the screen variables in the program—the system will assume that is the case.

Language 4 is again similar to language 2—but screen variables are separate to the program variables. Whenever a screen variable is referenced, it is referred to as Screen X; the program variable X is referred to simply as X.

In order for all these different cases to be correctly handled, scope loaders for each language are created 48. A scope loader is given the language roles to resolve issues such as "we have a variable X, are we talking about the screen variable or the program variables", and "This program doesn't declare a variable X, yet it uses it in the code. How does it do that?". Understanding this, and getting these scope loaders right is essential both for producing audit reports (do we need to say to the client "we have no definition of X", or is it simply defined in something else that should be attached to the program?) and for transforming the code.

At this point, the repository has been populated, and it is possible to identify any missing items. Audit reports 50 run completely off the repository—hence it is important that all information is loaded into there.

Firstly, a process called a reference resolver is run. It looks for any references to items, and tries to find the item in question. Note that the reference resolver makes use of the scope loader for source language to do this. If it can, these two items are then linked. If it can't, then it may be for one of three reasons:

the item is a built in function, variable or constant in the source system that has not yet been identified (see step 48);

for some reason, one of our earlier processes did not work—a program wouldn't parse, perhaps, or the tree created was not standard, and so the miners could not do their job properly; or, (if a check has established that it is not this); or the relevant source has not been provided by the client.

Next, the metadata is configured 52. At this stage, it is known roughly how to transform the system. Some of the transformation components have already been written, some are still to be written—but at this stage, it is necessary to decide which ones to use, and to pull them together.

Simple project information is stored in the transformation properties file for the project. Other information is stored in a control program for the deployment—it stores information such as which tree walkers to run, which Scope Loader to use, which Declaration Writer to use, etc.

Then, any required "built-in" components in the output language—Framework are written 54. If the input system has a built in function that says "get this variable, multiply it by 100 and display it in red", then a function that does the same thing in the output code is created. Typically, there will be anything between 15 and 40 functions built in to the input system. Some of these are simple functions, like date formatting. Others are more complex, taking care of database access or screen control.

A series of processes for capturing and generating English names for all declared items are performed 56. This includes:
Domain analysis;
Abbreviation expansion and translation;
Comment analysis;
Documentation analysis; and
Context analysis.

The candidate names are weighted for meaning and accuracy. An override is allowed, so that clients can influence the generation of a name. This is an iterative process to ensure that the best possible name is applied.

Next, BSD translations are written for built in functions 58. The standard English generated for BSD is not detailed enough to handle the built-in functions of a program. For instance, the standard BSD generation of a function might say: "Call the built-in, function Determine Next Row, called using parameters CLIENT, DATE, CLIENTID." This is not as descriptive as "Read the record from the table CLIENT which has a primary key of DATE and CLIENTID". Since Built-in functions are commonly used they are generally given a very specific translation, with a high degree of intelligence involved.

Ideally, when translating to a new language, data types that are inherent in that language would be used. However, in different languages, variables do not behave in the same way. Take decimal numbers for instance. If you multiply 3.141× 7.266, will the system store the result as 22.822506, or as 22.822, or as 22.823? As each system behaves differently, one of the first things that must be done is create data classes that behave like the input system data classes do.

Once a particular variable has been analysed, it might be possible to say "oh, this variable only ever gets integers 1 to 10 assigned to it—it will behave the same way in both language". In such a case, that variable can be transformed to a standard data type in the output language 60. However, this has to be done on a variable by variable basis. In some cases, what values might have been used may never be known, and so it may always be necessary to use a data class that mimics the input system.

Next, any framework required to correctly simulate the screen/report/program invocation is written 62. This is when a framework to behave like the input language is created. For instance, is the input language conversational or non-conversational? A framework is needed to do this. Do some programs initiate asynchronous jobs to run in the background? A framework that can do this is also needed. What happens if the system is shut down mid-transaction? The framework needs to handle this correctly as well.

Then transformation templates for input language to output language are created 64. These templates assist in identifying what Tree Walkers will be required, and what declarative information from the input system must be carried through to the new system. Transformation templates are not always created, but they assist enormously in the analysis of the language.

Basically, a template is created when someone from the framework team takes a couple of small programs from the input language, manually transforms them to the output language, and ensures that they can work. Typically, they will choose a program that:

accesses a screen accesses a database table handles any repeating records on a screen (scrolling tables, etc).

Once this is done, then the transformation team can better understand how to transform the code, and any potential problems are found early on in the transformation process.

Any Tree Walkers required to transform the code are written 66. This is where a considerable amount of the time and effort of transformation is spent. Some Common tree walkers that can do standard translations on any language have been created. However, most transformations require fairly specific transformations, hence language-specific Tree Walkers.

For all projects, there are transformations that MUST be made in order for the code to work in the new environment. In addition to this, there are enhancements that can be made, in order to make the code more succinct, or more Object-oriented, etc. The Tree Walkers are described in further detail below.

Next the names of all declarative items are converted 68. All programs, variables, files, etc, need an output name. For BSD, the transformation system uses the generated English-Name; for any other transformation, the system uses the TargetName.

A variety of processes are used to determine how to generate the TargetNames. Even after valid names have been created, Name Scrubbers are used to run against the names to ensure that all the names used conform to the naming standards and requirements on the output language. For instance, java does not allow dashes in names of methods or classes.

Homonyms, synonyms and uniqueness algorithms are then applied to ensure that the candidate name will be generated correctly in the output language.

The transformation control programs have already been mentioned as discussed above, but the control programs cannot be finished until all Tree Walkers have been identified and processed. This is done by setting up transformation control programs 70. These control programs contain the names of each Tree Walker to be run, the Scope Loader that is to be used, the DataTypeHelper to be used, the Declaration Writer to be used, and the Logic Writer to be used.

New variable declarations 72 can either be written to their own file (or class) or into the same file as the program, screen or report logic. Variable declarations make use of the DataTypeHelper to know how to convert and declare the different data types.

Next, screen XML files are created for the output language 74. A process is run to generate the XML files containing information on all the screen variables. This information is used to map the variables between the screen and the program. Then a screen creator is written for each different input language.

DB Table classes for the output language are then created 76. Typically, the database tables each have their own output file. This process is fairly standardised—however, there may be a few different built-in methods from the input system that need to be created here. Hence, the declarations of the tables and their columns is common for most translations, however, declarations of the methods available on those tables change for each input system.

Next, file classes for the output language are created 78. Files, like database Tables, are fairly standardised in their declarations, but may have input-language-specific methods that need to be added in.

Classes for any Repeating Screen Tables for the output language are created 80. This step is not required if a BSD deployment is being undertaken—however, they are definitely needed for any working system. Repeating Screen Tables—otherwise known as the scrollable sub-files shown on a screen—are very difficult to transform. Each input language has a different way of defining these items, and of processing them. Some languages explicitly check and process each row; in others, it is all handled implicitly by the system. Creating the classes to match these repeating records is currently very specific to the input language.

Reports are then created 82 which includes Report XML data for the output language and Report formats for the output language Next, the declarative information required to the output language is written 84. Programs are split into two sections: the declarative information, and the executable logic. The declarative information is stored in the Repository; the Executable code is stored in a tree format (as a BLOB in the repository). Writing the declarative information for each program/module makes use of the repository information and writes it out in the way that the output language expects.

Each input language has different built-in functions, and different system variables, etc. and so, when writing the output language, it is necessary to inherit from different base classes. Because of this, each input language requires different declarations at the top of each output program.

The program logic for the output language is then generated 86. This is generally the easiest part of the transformation. Tree Walkers have already moulded the code into something that the output language Deployer can handle. The Deployer simply walks down the tree and writes what it sees.

Next, the BSD Tree is generated 88. The BSD Navigation tree is generated from Declarative Data held in the Repository. The process can work against the COBOL style repository.

The code generated by the BSD Deployer has all the information required in it, but none of the formatting. The final step of the BSD process is to go through all the generated code, and prepare it for viewing in a web-browser 90.

Next, the HTML-ised version of any input code is generated 92, for inclusion with the BSD. The processes simply takes any text code as input and display them as HTML screens.

Finally, steps 38 to 90 are repeated until transformation objectives are achieved.

Figure 3:
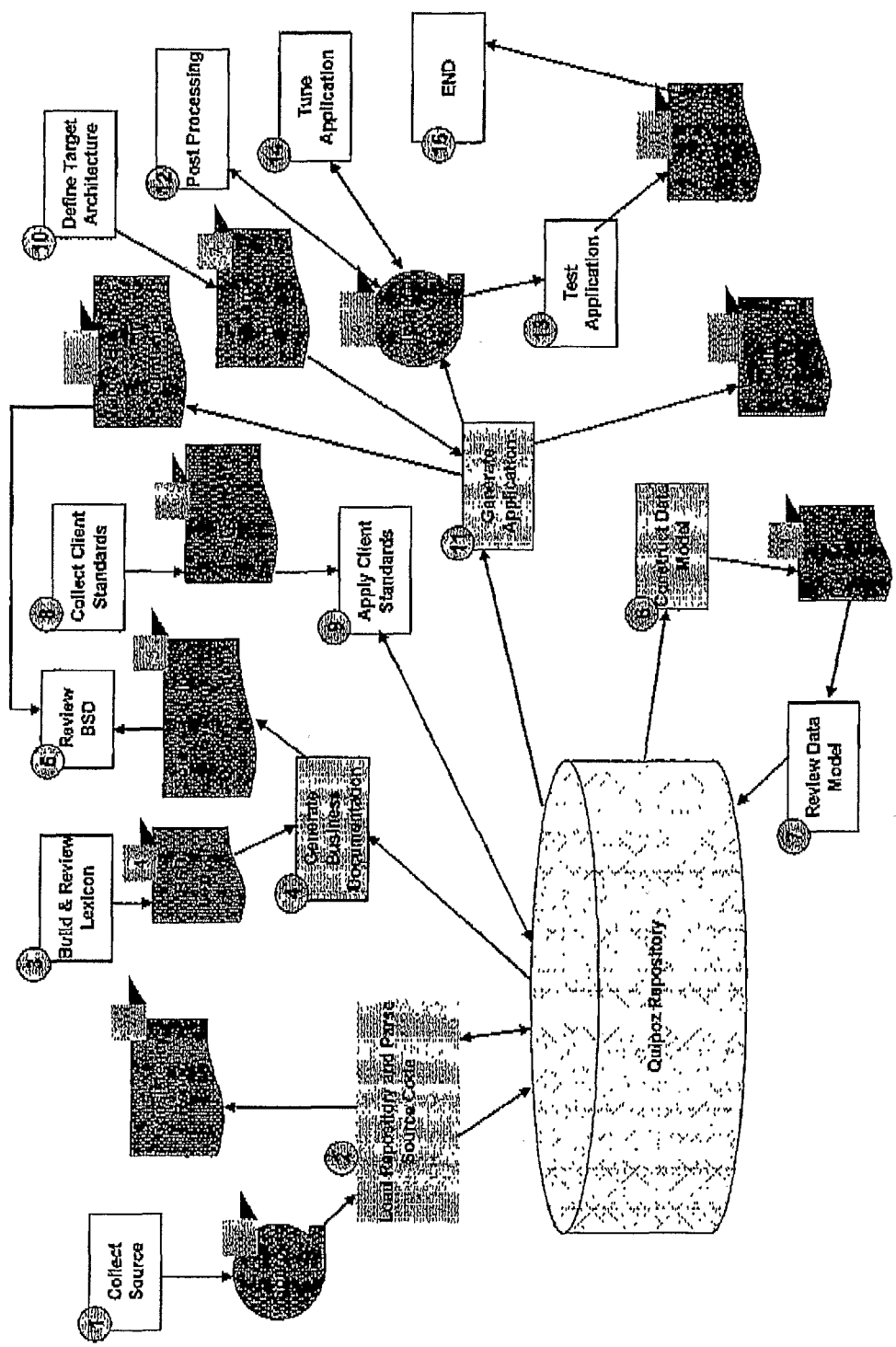
FIG. 3 is the transformation engine.

The Transformation Engine shown in FIG. 3 consists of a number of processes that make use of the unique software tools. These tools, or components, can be regarded as generic to the overall transformation process and are called upon by specific processes to achieve the transformation of an application.

The Standard Tree will now be described in more detail.

Firstly, the tree structure stores information about an application. Every component of a language must be identified and defined. By reducing each component to its basic meanings, the invention is able to rise above syntactic differences in languages, and turn each language into a generic form.

Figure 4:
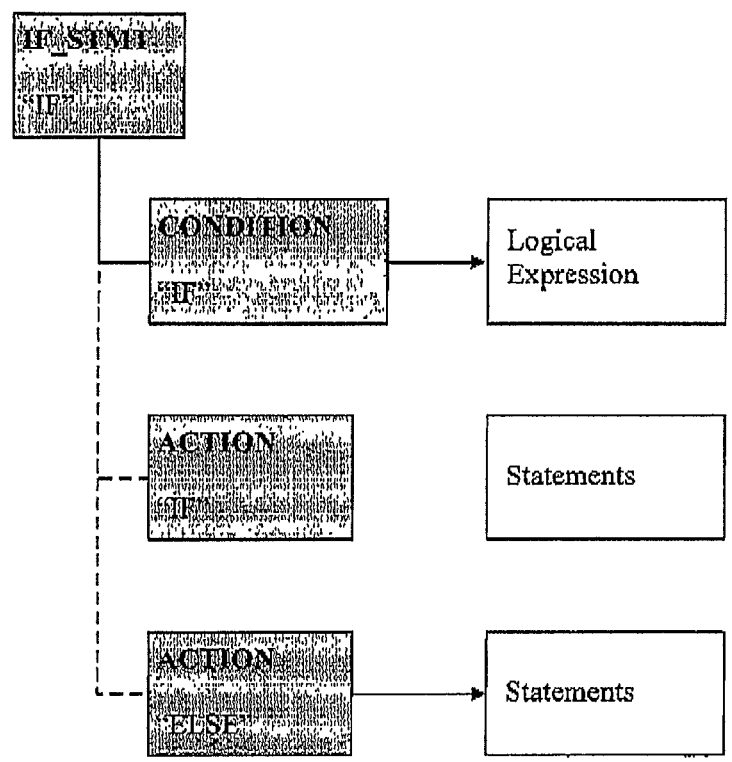
FIG. 4 is the required structure of an IF Statement node.

There are two distinct types of information captured on a Standard Tree:
- Declaration information that consists of any Named item (e.g. a program, a variable, a function, a named-loop, a paragraph, etc), along with all the attributes that that item may have (length, scope, visibility, English name, description, etc).
- Each attribute possible for each item has been defined, so that standard Miner processes can retrieve any relevant information and store it to the Repository.
- Logic consists of the actual statements that constitute the executable segment of a program. Every statement type has been identified, and the format of the statement has been mapped into a tree. It is the structure of the statement node as well as the node type and node text, that captures the required information. For example, in reference to FIG. 4 an If statement node will always have underneath it a Condition node with Node-text of "IF". It will also optionally have an Action node with node-text of "IF", and optionally an Action node with node-text of "ELSE"

The Node Structure
Each node has the following attributes.
   The Node Type.
      This indicates whether this node is an IF_STMT node, a VARIABLE_DECLARATION node, etc. The node type governs the structure of the node itself. For instance, all nodes with a type of IF_STMT must conform to the structure shown above,
   The Node Text
      The node text stores secondary information about the node. Sometimes it acts as a sub-type—e.g. an ACTION may be an "IF" action, or an "ELSE" action, etc.
      At other times, it acts as a link to the source language. For example, in the language LINC, an IF_STMT is coded as
      "Do When x=10
      . . . code . . .
      End"
      In this case, the IF_STMT node would have a text of "Do When".
   Line Number
      This is the line number from the input source language. It is useful for relating the tree structure back to the input source language, particularly used when debugging.

For coding purposes, each node is an instance of the Standard Node developed for this invention. The Standard Node class contains all the attributes listed above, plus the attributes required to link the node into the tree—ParentId, ChildId, etc.

In addition to this, the Standard Node class contains methods to aid in Tree Walking and deployment processes. The Standard Node is explained below.

Standard Node
The Standard Node is the name of the class which is used to model each node on the Standard Tree. It contains:
   a number of attributes with information about the specific node;
   a number of attributes which link the node into the correct place in the tree and
   a number of methods for gaining information about the node, or manipulating the node.
A Standard Node contains the following attributes:
   a node type—e.g. IF_STMT;
   a line number (referring to the line from the input source code);
   a Flag—this can be set by Tree Walkers to signify that the node must be changed;
   an ID and
   a parent ID, child ID, Left and Right Sibling ID, to link the Node in place in the tree
A Standard Node contains the methods—i.e., each node knows how to do the following—such as:
   Get next sibling;
   Get parent;
   Get first child;
   Find the first child node with specified Type or Text or both;
   Find the first Parent node with specified Type or Text or both;
   Make a copy of itself with all links;
   Make a copy of itself with all lower links;
   Remove itself from a tree;
   Replace itself in the tree with another;
   Add a new child or sibling Standard Node;
   Add a new child or sibling QS and transfer control to the new Standard Node;
   Find the first non-comment child or sibling.
These methods are most commonly used when creating transformation tree walkers, or tree miners.

Inherent to each Node Type is its Node Structure. For example, the structure of an IF_STMT is that it must have a CONDITION node, and can optionally have two ACTION nodes. This Node Structure is stored in a text document form. It is the knowledge of this structure that allows the system to manipulate nodes and walk trees.

It is possible to expanding the Standard Node, and having a node class that is specific for each type of node. This would allow a Variable node, for instance, to store information that is specific only to variables, and to contain methods applicable only to variables. In such a case, the Variable Node type would know the structure acceptable for a variable.

Also, the Standard Node can be expanded so that more Transformation information can be attached to the node— e.g. "This one might be a candidate for de-duplication", or "this method is referenced from three places", etc.

An example of treating a Standard Tree based on code will now be described.

Most parsers simply recognise the words and symbols used in a language, and put them into a tree format—a Syntax Tree. When creating the tree, these parsers do not use any intelligence—they simply output what they see.

The parsers of the invention, on the other hand, embed a lot of intelligence into the parsers while building the tree. As well as recognising the words and symbols of a language, the parsers of the invention do the following: translate these symbols into standard definitions, determines what role an item is playing at that point in the language, and creates extra elements on the tree to symbolise concepts.

Figure 5:
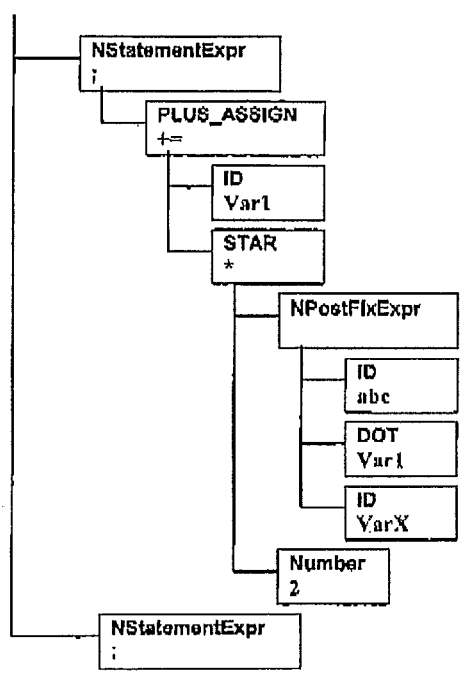
FIG. 5 is an example Syntax Tree created from two lines of C code.

To demonstrate this, consider the following example of a snippet of C code, and compare two Trees that can be created from this code: a Syntax Tree that is produced by a freely available C Parser, and the Standard Tree that is created by the parser of the invention.

var1+=abc.varX*2;
calculate(var1);

FIG. 5 shows the Syntax Tree built by a standard C parser. The sub-tree for the first statement has been fully expanded. The Sub-tree for the second statement has been left un-expanded.

On this Tree, note the following items:

Both the statements start with the same node, nStatementExpr, even though they are quite different statements.

Symbols in the C code have come through as is—for example, STAR and DOT. There is no indication of what these symbols actually mean.

The structure of the Tree is essentially meaningless, unless a. you know that this tree represents a C program, and b. you understand the C language.

By comparison, the parser of the invention creates a Standard Tree that identifies and explains every component of the language, and whose sub-Trees have the same format regardless of whether the input source language was C or RPG or anything else.

Figure 6:
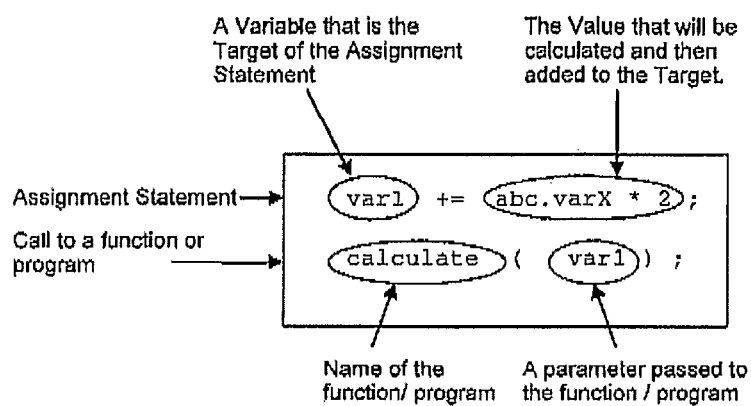
FIG. 6 shows the analysis of the C code fragment.

To do this, first the parser must have knowledge of every component of the input language. FIG. 6 shows the first step of this based on the sample C code.

Next, the person who created the parser maps these statements to the Standard Tree format, to determine what type of Sub-Tree should be created for each component. This format is standard for all languages, making it irrelevant whether the source language originally said:

var1+=abc.varX*2
or
Add (2*varX of abc) to Var1

Figure 7:
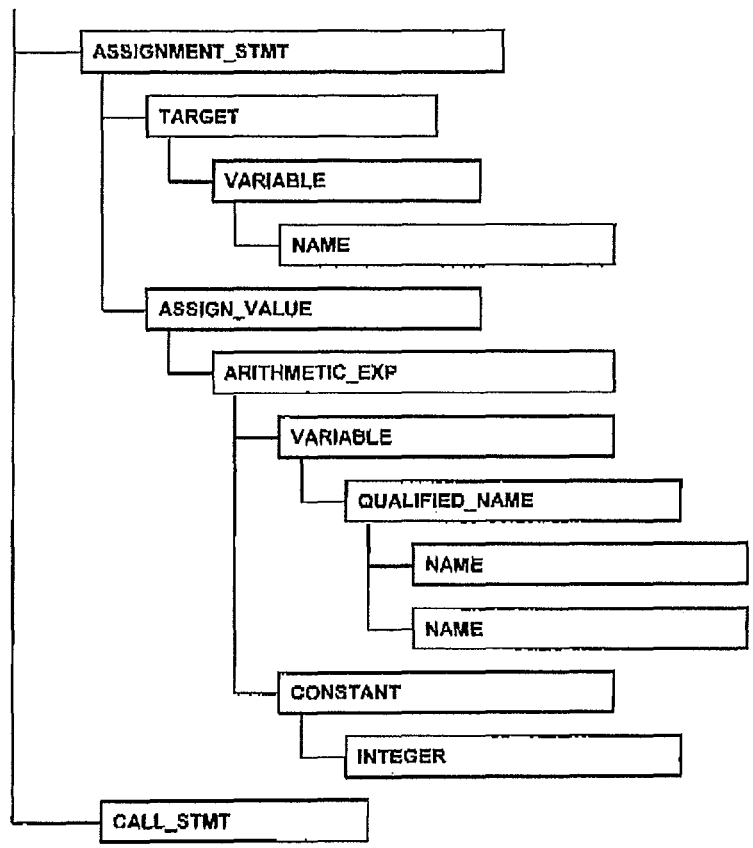
FIG. 7 is an example of a Standard Tree created using the invention based on the same two lines of C code.

Once the language has been mapped to the Standard Tree format, then the person who is writing the parser ensures that the Tree that is created matches the tree required by the Standard Tree. The resulting Standard Tree is shown in FIG. 7.

The Standard Tree can now be utilised in several ways.

Analysis can easily be done, because all the components are named. For example, it is often necessary to find all locations in the code where a variable is set. This can easily be done by finding all Variable nodes that appear under a Target node.

Enrichment can easily be done. By walking this Standard Tree multiple times, and storing and retrieving information in the Repository, information can be added or moved around the Tree. For example, extra information can be added to the variable node such as the type or length of the variable— information which is stored in the Repository.

Deployment to another language can easily be done. Each language deployer knows how to write an assignment statement in its target language.

The Repository

The aim of the Repository is:

To capture all declarative elements of an application
To store any executable code along with the declarative item that owns it.
To store the relationships between the different declarative items.
To enable analysis of the data
To capture the Metadata for a project.

To this end, three types of information are stored on the Repository:

(i) Declarative Data;
(ii) Analytical Data and
(iii) Metadata.

(i) Declarative Data

A declarative item may be a program, or a variable, or a screen, etc. All declarative data may have executable code associated with it (initialisation code for the variable; validation code for the screen; logic for a program), and, within an application, everything must have some sort of relationship with something else—for instance, a program might own a variable, and a program might reference another program.

All declarative items are called Objects. They are all stored on a database table called Object Node. There are a few things that all declarative items have in common: a name, for instance, and a type. All things that are common to all declarative items are stored on the object node table: Input Name, Target Name, English Name, etc. Any executable logic attached to the item is stored on this table also, as a Syntax Tree.

As many languages allow multiple items of the same name to exist (if they are in different libraries or directories, for instance), all tables, including the ObjectNode table, are keyed by ObjectNodeId.

The Object Node must be one of several different types: Module (Program, Function, Method, Paragraph, etc), Variable, Screen, File, Table, Report etc. . . . Any details that are relevant to the particular Object Node type are stored on these tables—for instance, the Variable table stores Input Data Type and Target Data Type.

The relationships between the different Object Nodes are represented by the Object Node Relationship table (ONR). The ONR table stores all cross-references, along with their types. For instance, is the relationship an OWNER relationship (the object that is OWNED does not exist without the OWNER), or is it a REFERENTIAL relationship (the two objects exist without each other, but make reference to each other)?

The Repository is designed to capture all attributes for any Declarative items. However, often with new languages, there are attributes that are not quite understood, or seem to be irrelevant. These still have to be captured, but, since they do not fit in with any of our standard attributes, there is no column to store them in. In such a case, the information is stored in the ExtraDetails table attached to the ObjectNode table. The ExtraDetails table stores simply the Id of the ObjectNode it is referring to, a Key, and a Detail.

Various views are available on the database to easily extract commonly required information, and to ease the transition between the old-style database and this one. For instance, an extremely common requirement is to find all Methods within a program. To select from the tables would require a join between ObjectNode and Module to find the Program Modules; a join from there to Reference, and then a join from there back to ObjectNode and Module to find the Method Modules. This has been replaced by a single view, ProgramMethods.

Analytical Data

Analytical tables are used to capture information about how and where an object is used. Analytical data that is stored includes the References—Program A calls Program X and that Program A uses Table Z.

These tables can be used to capture more Analytical information in order to correctly analyse variable usage, data types, code duplication, etc. This will include:
- where a variable is used or assigned;
- when does a variable appear to be checked without being assigned;
- what different types of parameters are passed into a program/function;
- where is a table updated/read and
- where is a file updated/read.

(ii) Metadata

Currently, there are two metadata tables on the repository: The Data type Translate table stores information on all data types for all languages. The InScopeItem table, which controls which objects are to be processed by which job. Metadata can capture any information in metadata that can drive the processes.

Information Access and Modification

The following tools utilise the unique structure of the Information storage components.

Accessing the Repository

There are obviously two ways of accessing the Repository: manually, or programmatically.

Accessing the repository manually is really only suitable for performing selects, or for performing simple data updates. The level of normalisation in the database, and the use of automatically generated IDs mean that inserting new information into database tables is not easy to do through manual SQL statements.

A large number of views have been created on the Repository to make manual queries easy to manage.

Programmatically accessing the database is easy. When using the classes to access the data, it is important to understand the relationship between the classes and the database tables.

Each table on the database is represented by a class. Each class knows how to save/update/delete itself automatically, and handles any resulting errors. Methods have been provided in each class so that the programmer can easily say "this variable is owned by that program", etc. . . .

Figure 8:
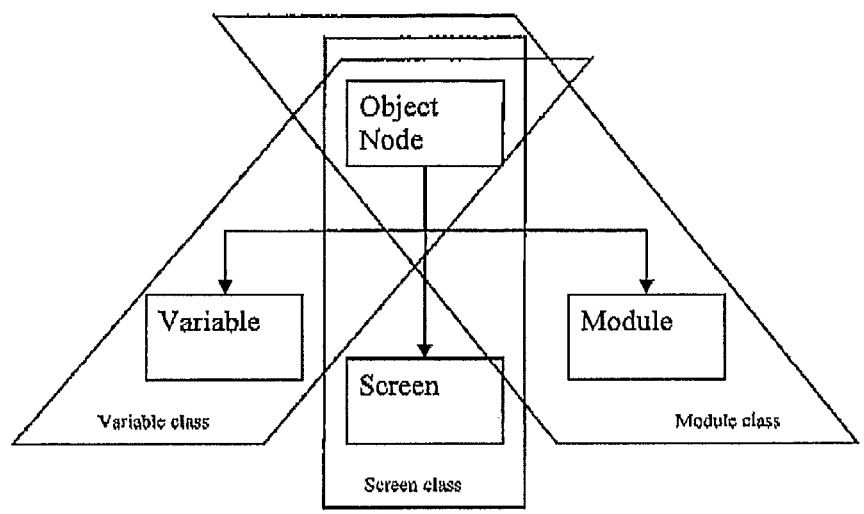
FIG. 8 is a sample of Repository Class Hierarchy.

However, more than that, each class may control more than one table. Repository class hierarchy is shown schematically in FIG. 8 where the database tables are the smaller boxes, and the classes are the larger boxes. The Module class can control not only the Module table, but the ObjectNode table as well. This is true for all the Declarative Items: Table, Variable, Screen, Module, File, Record. Each class representing these items can control access to the ObjectNode table, the ExtraDetails table and the Description table. In addition, the Variable class can also control access to the Modifier table and to the ArrayDimensions table. One single method in the Variable class can update/insert/delete rows in all of these tables.

A RepositoryData Access Object (DAO) class encapsulates a large number of generic SQLs, and is available for use by programmers. Typically, these SQLs are of the following style:
- Retrieve/insert/update/delete all rows
- Retrieve/insert/update/delete the row with a specific ID
- Retrieve/insert/update/delete all rows with a specific InputName.

Tree Walkers

"Tree Walker" is the generic name given to a group of processes that walk a Standard Tree, and carry out a specified task—typically transforming the tree in some way. Tree Walkers are very specific to a single task—for instance one Tree Walker may resolve GOTO statements; another tree walker may qualify variable names, etc.)

Tree walkers can be written to be either:
- Input language specific, working from input-language flavoured tree,
- Input language specific, working from generic tree or
- Generic.

A selection of all three types of tree walkers is often required for any transformation.

Despite the fact that they work on different trees, however, each tree walker is essentially the same in structure. Each Tree Walker extends a class called Walker, and has a basic method called Walk. Tree Walkers are not main programs in their own right. They expect to be called by another program which will pass them the tree which they are to transform.

Each Tree Walker recurses down through the tree structure, checking each node as it does so, until it finds one that it is interested in. As soon as a tree walker finds a node that it is interested in, it performs its required actions on the specific nodes, and then continues walking. Each Tree Walker will return a new, transformed tree to the calling program.

Tree walkers can be written to be a specific or generic as necessary. They can do tasks from as small as changing the name of a function, to as large as completely re-ordering sections of code, or creating new code.

Each node on a tree is an instance of a Standard Node and each node may be the root of another sub tree. The Tree Walker navigates around the tree and makes necessary modifications, in one of four ways:
- by using the methods available on any standard node—Standard Node;
- by the coder's knowledge of the inherent structure of a particular node type;
- by using Node Helpers, which know the exact structure of a particular node type, and provide useful methods for getting information and transforming it or
- by using any of the search and retrieval methods which add functionality to the Standard Node.

The Standard Node class provides a lot of standard methods for the Tree Walker to use. The Standard Node contains all the methods that a Tree Walker needs to navigate around a tree, and to modify, create or delete new nodes and sub-trees. These methods are standard to all different node types.

The problem with this, however, is that, although each node has many methods, they are all very generic. No Standard Node knows what its sub-tree structure is supposed to look like. For instance, as described above every single node type has a specified structure. A generic node class does not know the structure of a specific type and, so, cannot provide methods based on this. For instance, a generic class will not know that if the node type is IF_STMT, then it is expected to have 1 CONDITION node and optionally two ACTION nodes underneath it. Tree Walkers overcome this problem in one of two ways—either by coding the structure into the Tree Walker, or using a Helper.

If the person who codes the Tree Walker knows the structure for any given node type, then they can code accordingly. Most Tree Walkers have been written to expect a particular node structure.

Sometimes, however, it is useful for a node to know its own structure, and to have methods that are specific to a particular node type. For instance, on an InvokeModuleExpression (otherwise known as a function call), one might want to get a list of all the parameters, or count the number of parameters, etc. These methods are specific to the InvokeModuleExpression node, and so have not been implemented on the Standard Node.

The idea of a Helper is that it takes a specific node and provides all the methods necessary to transform that node. A Helper node knows exactly what the structure of a particular Node must look like. Currently, the Tree Walker has to know the type of the node, to determine which helper to invoke. Alternatively, a Helper Factory will look at any node and supply the Tree Walker with the correct helper.

In addition to this, extra tree navigation and search classes are defined. These can be used in more specific translations, such as the OS2 C to Windows C transformation.

Tree Walkers make use of both Helpers and the standard methods available on the Standard Node class to move data around the tree, and to make changes to the structure and content. In addition, they may refer to the Repository for extra information about a named item.

Tree Walkers will only be applied to input processing if the Parser cannot create the standard Tree format or if information needed by the Miners needs to be clarified. In general, on the input side, it is preferable to keep the code as similar to its input language as possible.

On the transformation side, are all of the other Tree Walkers—the Enrichment Walkers and Transformation Walkers.

The following is a list of existing Tree Walkers, and a brief description of what they do:

| | |
|---|---|
| Common_Goto_ExitName_Walker | Searches for any GOTO statements that simply go to the exit-point of a module, and changes these into RETURN_STMTs. |
| Common_ModuleComment_Walker | Searches for any blocks of comments that immediately precede a module declaration. It assumes that these comments are actually describing the module, and so attaches them to the module as such |
| Common_PromoteIMEName_Walker | Takes InvokeModuleExpression nodes (IMEs), and checks their names against a list provided. If the IME name is on the list, then a specified parameter is promoted to be part of the name. This effectively changes IMEs from the format of, for example: write(myFile, "hello") to myFile.write("hello"). |
| CommonGOTOWalkers | Attempts to resolve GOTO statements in any number of ways. |
| Common_ModuleOutOfScope_walker | Looks for any calls to programs that are not in scope, and replaces them with a call to a framework method, to log an error. This is used in Java transformations, so that if the code attempts to invoke a program that is not in scope, an error is logged. |
| Common_RemoveMainAction_Walker | Many Input languages have no "main" code attached to the program - instead, all the code is contained in methods. This is typical of a 4GL, where the 4GL application intrinsically knows which method to call first, and so there is no actual call made in the code. This walker looks for empty Program Actions, and removes them. |
| Common_ReverseQualifiedName_Walker | A Qualified name is the term given to the relationship A.B, or B OF A. The structure of a QUALIFIED_NAME node requires that the first NAME node is the owner of the second NAME node. However, sometimes this is not easy to do while parsing. This walker, therefore, is used when, while parsing the input language, the QUALIFIED_NAME node came out back to front. |
| Common_SelfAssignment_Walker | This is an enhancement type walker. It looks for any instance of a mathematical equation, where the TARGET is also used in the calculation (e.g. $X = X + 1$), and changes them to the format of $X += 1$. Can be used on any language. |

Other walkers can be Input Language Specific.

In some instances, Tree Walkers which simplify the code have been developed. For example, there may be a commonly executed group of two, three or more lines of code, which should really be turned into a function or into a different type of statement.

Such Tree Walkers can be very language specific. Alternatively, a walker can be written that will take a list of code patterns, and a list of replacement code patterns, and do these type of transformations automatically.

The following is a brief description of Enrichment Walkers:

| | |
|---|---|
| Boolean Variable Check | When the input language does not have a Boolean datatype, there are often conditions in the code that say things like 'IF X = "TRUE"'. This can be modernised to: make X a Boolean type, and change the comparison to say "if X". This Tree walker would need to use the information gathered by the Variable Usage Miner, and the Variable Value Miner. |
| Common Code Pattern Replacement | A Tree Walker that, when given as input a Code Pattern, and a Replacement Code Pattern, will search for any instance of the Code Pattern and replace it. Code Patterns are accepted in the form of Standard Trees. |
| Code De-duplication | Tree Walkers can be used to identify whether two segments of code are identical, similar, or not at all the same. Commonly, this check would be triggered off a particular data item: "when you find an update to this table, make a note of it, and compare it against any other updates to this same table to see if they are identical". This Tree Walker would require somewhere in the repository to temporarily keep copies of the sub-trees. |
| Variable Scope Changing | Currently, when transforming to java, all variables are declared at Program scope, as that is where they are declared on the input language. It doesn't have to be like this in Java, however. Once the Variable Usage Miner and Variable Value Miner have been implemented, then we can identify the scope of a variable, and consequently use a Tree Walker to move the definition of the variable to a more appropriate place. |
| Variable Data Type changing | Once we know exactly where and how a variable is used, then we can determine if it can be implemented in a base data type in the output language. For instance, loop counters, which might only ever get assigned the values 1 to 10, can be implemented as Int types in Java - but only once we have ascertained that that variable is never used anywhere else, and doesn't ever get assigned a value of 3.141592. |
| Change static references to non static | When procedural programs are implemented in Java, they make use of a lot of static methods. |

Tree Manipulation Tools

All executable code is stored in Tree format. In order to transform and manipulate this code into the desired output the follow is a number of specific methods to assist.

(i) Node Helpers: Node Helpers are classes that match the type of a node, know the Structure of the Node and contain many helpful methods for using and transforming that node. These are particularly useful, as they keep the knowledge of the structure of the node in one place, so changes to that Nodes structure can be easily implemented.

Examples of these are:
   NodeHelperIME
   NodeHelperVARIABLE_DEFINITION
   NodeHelperPARAMETERS
   NodeHelperMULTIPLE_DEFINITION (ii) Node Traversers: Node Traversers are simple classes that travel around the tree in a specified way—either up or down from where they are started, going either depth-first or sibling-first. Typically, these traversers will carry with them a Visitor class. Think of it this way: the Traverser is a bus that travels a set route through the tree. At each node, the bus stops, the Visitor gets out, does some little job that he is supposed to do, then gets back on the bus and goes to the next node.

Examples of these Traversers are:
   DescendantTraverser
   AncestorTraverser
   TreeTraverser
   SiblingTraverser (iii) Visitors As described above, Visitors are classes with a job to do. They get carried around the Tree by the Traverser, and at each node, they do their job. Typically, a visitor will just check each node to see if it is one that it is interested in. If it is, then it will do whatever task it has been coded to do. If not, it will just keep going. Visitors can be created as FindFirst visitor, which will stop the bus as soon as he has done his job; and FindAll visitor, who will keep going to the end of the line.

(iv) Filters: Filters are classes that can check to see if this node is one that is of interest. Usually, when a visitor is sent off on a traverser, it will be given a filter, that will return True if the node is one that they want to look at or False if it isn't. There are the following Filters:
   TypeFilter: simply checks the node type against the one it has been told to search for.
   TypeTextFilter: checks the type and text of the node against the one it has been told to search for (v) Tree Miners: Once an input file has been parsed into Standard Tree format, information can be retrieved from it and saved to the Repository. The processes that do this are called Miners.

On the Repository, three types of data are stored:
   Declarative Information
   Analytical Information
   Metadata.

The Metadata is manually inserted into the database.

Declarative information is basically the definition of anything that is named. It can be a variable, a program, a method, a screen, etc.

Analytical Data is details on the usage of any object.

Both Declarative and Analytical data are loaded into the repository via Miners.

A Miner is a program which will basically just recurse down through a tree structure until it finds a node that it is interested in—for instance, a VariableDefinition. Once it finds the node it is interested in, it gets all the information that it can about it (the Miner always knows the structure of the node that it is interested in), and saves this information to the database. The program controlling the miner will ensure that the item is inserted at the correct point in the scope. That is, if a variable is declared within a method which is within a program, then, on the database, that variable will be owned by that method which is in turn owned by that program.

In general, once the information from a Declarative node has been mined it is removed from the tree. This is because the storing of a definition of an item both on the tree and on the database cause problems. The definition from the tree is removed as soon as it is mined, and the definition that is stored within the repository is the one which is modified and transformed.

If there is any executable code attached to the item (for instance, programs and methods have both declarative information and executable code) this is stored in tree format with the item on the repository.

Figure 9:
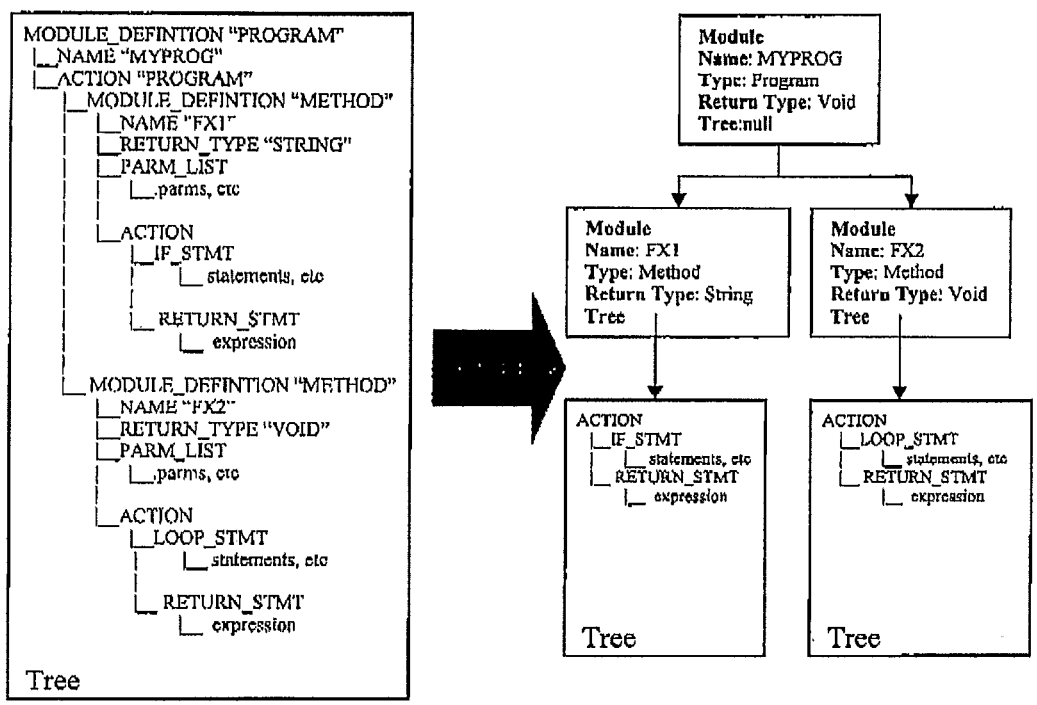
FIG. 9 shows an example logic tree.

As soon as an input language is parsed into a Standard Tree it can be mined. All of the ProgramParserxxxx classes will call the basic mining class (aptly named Miner) to save the newly parsed program to the database. This Miner will split the program into the declarative parts and its executable parts, attach, the executable parts to the correct declarative part, and save them all to the repository. What this means is that one whole Input Tree, which was made up of Declarative Nodes and Logic Nodes, is split into lots of ObjectNodes on the database (one for each program and one for each method) each with its own Logic Tree attached, as illustrated by FIG. 9.

The following is a description of the different types of miners:

| | |
|---|---|
| Miner | Extracts all Module declarations |
| CalledModuleMiner | Finds all calls to functions, programs, methods etc, and loads these into the Reference table. If the method being called is local to the program, it resolves the reference straight away. |
| ScreenMiner | Looks for all Screen, Report, Record and Screen Field declarations |
| VariableMiner | Lookds for all Variable Declarations. |
| VariableUsageMiner | Determines where a variable is used - assignment and reference |
| TableAccessMiner | Determines where a table is accessed - update, insert, delete. |
| ParameterMiner | Extracts details of all parameters used when calling a module |

Deployers

Deployment processing currently includes Transformation as well as deployment. Each target language has several separate deployers:
  A variable deployer
  A Logic deployer
  A Table deployer
  A screen deployer
  A Report deployer
  A program declaration deployer The Variable, Table and Program Declaration Deployers work solely off information stored in the Repository. They load up the item to be deployed, and any item that is owned by it, and write out their declarations in the target language. For each of these processes, there is a standard one, and one that is slightly different, depending on the original input language.

In general, these processes are coded according to a template, which should be created near the beginning of each transformation project.

The Screen and Report deployers also work off the Repository. However, their format is not as standard, as there are no generic process to produce these at the moment.

All program deployment is run by a program called DeployEngine. The DeployEngine does the following:
  reads the declarative information for each program module from the Repository;
  creates a new file for each Program module;
  loads the scope for the module (i.e. gets all variables, functions, etc. that the Module may wish to use);
  calls the Declaration Writer to write out the declarations;
  gets the logic tree attached to the module;
  applies any Tree Walkers to the Tree;
  calls the LogicWriter to write the executable code for the Program Module and
  finds any sub-modules attached to this module (e.g. any methods, functions, etc), and repeats the above processing for them.

The Program logic deployer works off the Standard Tree. It is developed using a tool called ANTLR. The logic deployer walks the logic tree that it has been given, and writes out each line of code, one by one. For instance, when it reaches an IF_STMT node, the Java logic deployer knows to write out "if ('' and then the condition, and then '') {" and then the action and then "}".

Whenever the logic deployer reaches the name of an entity, it uses this name to look up the entity in the scope table, to determine what the entity's target name and data type is. The deployment always uses the target name of an item, never its input name. This processing is handled the by the Expression class—for Java deployment, it is the JavaExpression class.

An operator class also exists, to handle every operator type. It knows how the operators affect the type of an expression (e.g. an expression number1 LessThan number2 will result in a Boolean type); and how each expression handles each operator (e.g. X=Y is written as X.set(Y) if X is a FixedLengthString, and X=Y if X is a String).

Program Controller.

The DeployEngine itself is controlled by a project controller class. If the project is to convert CSP to Java, then there will be a class called CSPtoJavaDeployer. It is this class that contains the lists of Tree Walkers that need to be processed, the types of declaration writers that need to be used, the type of scope loader to be used, etc.

Enrichment

The 'Enrichment' stage includes major automated code redesign. In the input stage, every available information component about all operations and variables in the input code has been captured and the various execution paths to identify execution sequence and dead code have also traced.

Restructuring is automatically performed during enrichment. The nature of this restructuring depends upon the target environment. If the target is Object Oriented then restructuring is designed to facilitate the implementation of a multitiered OO design. This requires extensive variable scope analysis. If the target is a structured language such as COBOL, then a structured solution is facilitated. Some of the processes in this enrichment step are;
  Loop analysis
  Identification of sophistication upgrades eg nested IF to CASE, GOTO to PERFORM statements
  Removal of remaining GOTO statements
  Unit of work identification
  "Englishification"
  Component identification
  Variable scope analysis
  Code duplication analysis
  Process de-duplication
  Extract data model
  Build object model (if for an object model based solution)
  Convert components to methods and assign to object model
  Re-factor (if for an object model based solution)
  Interface identification and analysis.

Enrichment is done as an automated procedure after tokenisation because:
  The cost and effort of performing this restructuring manually would be prohibitive, and Automated code cleansing would be inefficient without the sophistication of the fully parsed and tokenised, syntax-free code produced by our input processor as input to the enrichment process.

Typically, the cyclometric complexity of poorly structured programs is reduced by about 80%. The objective is to reduce the cyclometric complexity (CC) of the generated code to less than 5.0. Well written COBOL code has a CC of 5-8 and this cannot be significantly improve upon this. Poorly written code on the other hand has a CC of up to 1,000. If the CC is very high, good code is harder to produce. Typically, poorly written code has a CC of 8-100 which can be reduced to between 5 and 15.

Once the code has been analysed and enriched the deployment process is implemented. In this process each technical function is mapped to the target language and architectural functions. This frequently requires significant additional restructuring. Some aspects of the implementation are determined by the unit of work analysis and the complexity of restructuring which is required for the various potential solutions.

It is as part of the output/deployment process that architectural frameworks are mapped at the metadata level into the code interfaces and functionality. The objective is to generate code in the paradigm of the target language and platform.

The net result is that the code quality is maximised at each stage of the process, towards compatibility and compliance with the target architecture. Without this continual analysis and restructuring it would not be possible to produce an "agile" architected solution with the desired quality and maintainability.

At a more detailed level, the key observation is no need to build a total (traditional) independent language as the basis for transformation.

An example of the Enrichment process will now be described.

Code Enrichment and Transformation

Once Source Code has been parsed into the Standard Tree format, it is time to begin analysis and transformation of the code. This is typically implemented by Tree Walkers, which due to their knowledge of the format, can search through the tree looking for specific code patterns, and then transform any instances as required. Below-are-details-of-a-samplo Transor-matien-and-Enrichment-{Process:—

In some older languages, GOTO style branching statements are extremely prevalent, and are often used to force the code loop around again and again until some condition is reached. This type of coding is called a Goto Pseudo Loop. The code used to do this is often verbose and unstructured, making the code difficult to read and maintain.

A better coding style is to use a loop structure to perform the same function. The coded is more structured, simpler to read and execute, and allows further analysis and objectification to take place.

As part of the enrichment and transformation processing, all such Goto Pseudo Loops are identified and replaced by true Loop statements.

Figure 10:
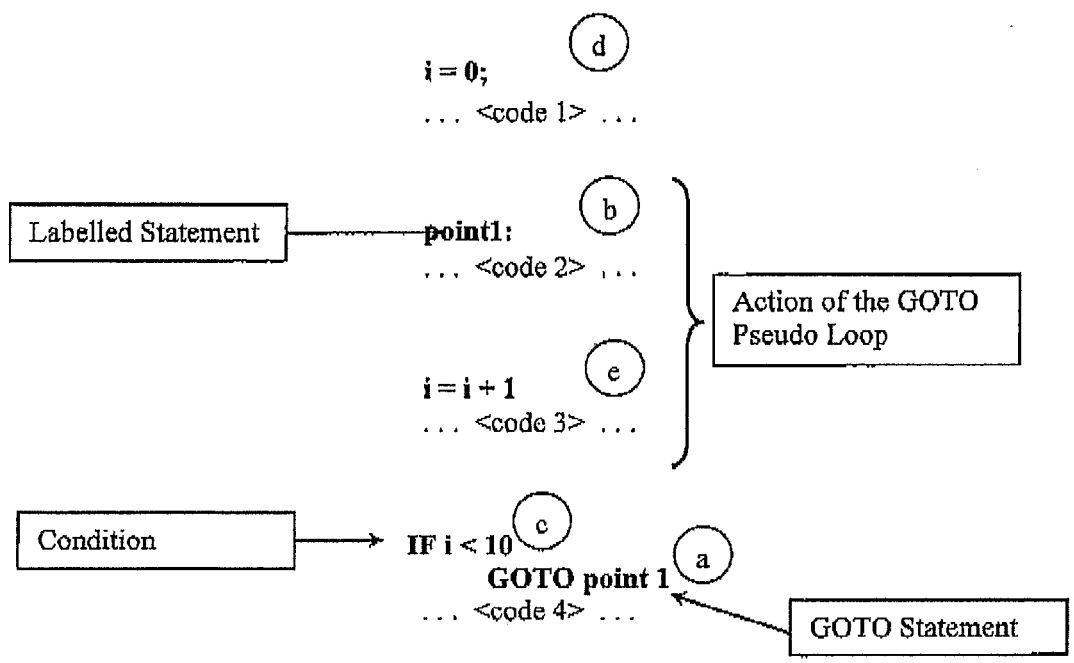
FIG. 10 is an example of pseudo-code.

There are two parts to this process: Identification of candidates and Transformation. To illustrate this, consider the following example of pseudo-code shown in FIG. 10.

The identification process involves the following steps:
1. Identification of a GOTO Pseudo Loop starts from a GOTO Statement (a).
2. See if the GOTO statement is pointing backwards in the code to a Labelled Statement (b).
3. If so, then look at the Condition (c) and identify the controlling elements. In the case above, the controlling element is the variable i.
4. Confirm that the controlling elements) is initialised before the Labelled Statement (d), and
5. Confirm that the value of the controlling element(s) is modified between the Labelled Statement and the GOTO Statement (e).

If the Tree Walker confirms that all the above conditions are met, then transformation can take place.

There are a few variations on the style of transformation that can take place, depending on the variations in the GOTO Pseudo Loop itself.

For example, the code can be transformed into a FOR loop if:
the code at <code 3> does not use the controlling element, and;
the code at <code 1> does not use the controlling element.

Otherwise, the code can be transformed into a standard While Loop. For the purpose of this example, we will assume that a FOR Loop can be used.

To transform this GOTO Pseudo Loop into a FOR Loop, the Standard Tree would be modified as follows:
1. A FOR Loop node is created.
2. The Statement at (d) is taken out of the tree and added under a new LoopStart node.
3. The Statement at (e) is taken out of the tree and added under a new LoopIncrementt node.
4. The code between (b) and (c) is moved out of the tree and into the Loop Action node
5. The Statement at (c) is taken out of the tree and added under a new Termination Condition node.
6. The GOTO Statement (a) is removed from the tree.
7. The Labelled Statement (b) is replaced by the new FOR Loop.

Figure 11:
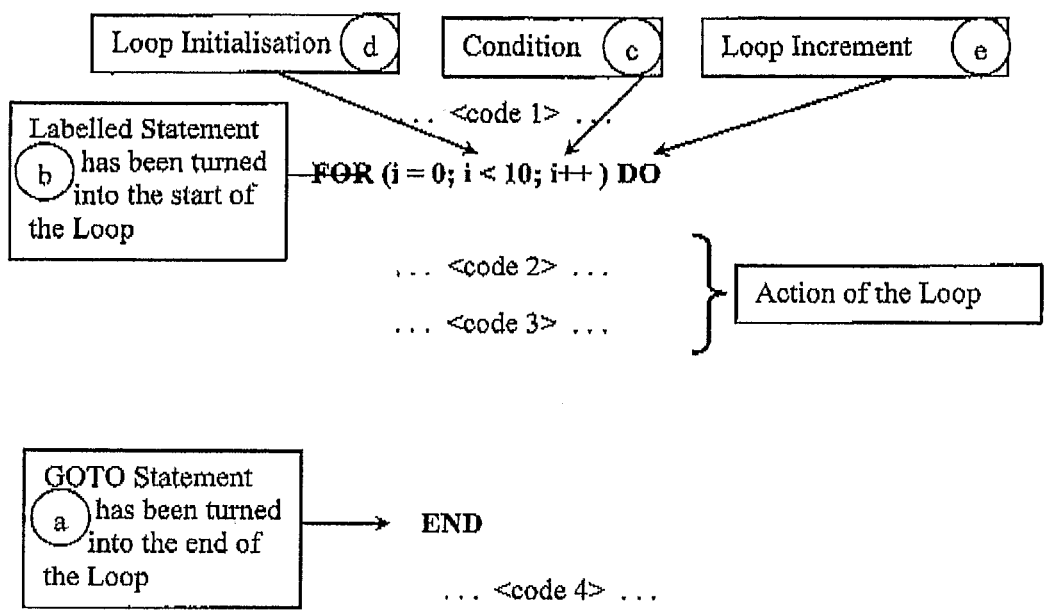
FIG. 11 is the pseudo-code transformed into the C language.

After transformation, the code segment will now read as shown in FIG. 11.

The system replaces the build of a total independent language using its tree structure. This operates by mapping everything to a 'Standard Node'.

There are six linked parts to the process of creating and deploying structured nodes within the tree walker technology, linked below to the input, enrichment and output processes within the transformation engine.

FIG. 3 shows more specifically the Transformation Engine process. The processes are identified by the numbered circles which correspond to the process list in the table below. The square shaded numbers represent deliverables in a particular state.

The processes squares with a darker shade represent those processes which make use of the Generic Components which will be described. These perform the crucial elements of the transformation functionality—Input, Enrichment and Output.

This diagram sets out the context in which these unique components operate. It shows both the critical, automated processes and the associated manual procedures that go to make up the Transformation Engine's steps which result in the transformation of an application from its existing technological state to a different technological state.

The manual procedures, while important in the overall sense of being essential in achieving the ultimate aim of transforming the application, are peripheral to the critical software processes to bring a high level of automation to the process.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

GLOSSARY

| | |
|---|---|
| Filters | Filters are classes that can check to see whether a particular node is one of interest. Usually, when a Visitor is sent off on a Traverser it is given a Filter that will return True is the node is the one that is wanted or False if it is not. |
| Helpers | Node Helpers are classes that match the type of Node, know its structure and contain methods for using and transforming the Node. The helpers keep the knowledge of the Node Structure in one place, enabling easy implementation of changes to the structure. |
| Miners | A Miner is a program that will travel through a tree structure until it finds a node that is of interest to it. When it finds such a node it will gather all of the information about it and saves the information to the database. A miner knows the structure of the node in which it is interested. |
| Standard Node | Standard Node is the name of the class which is used to model each node on the Standard Tree. It contains: a number of attributes with information about the specific node; a number of attributes which link the node into the correct place in the tree and a number of methods for gaining information about the node, or manipulating the node. |
| Standard Tree | A tree structure to store information about an application. |
| WSL | Wide-Spectrum Language |
| Traversers | Traversers are simple classes that travel around the Standard Tree in a specified way - up or down going either depth-first or sibling-first. Typically, traversers carry with them a Visitor class. |
| Tree Walkers | Tree Walkers are processes that walk a Standard Tree and carry out a specific task - typically transforming the tree in some way. |
| Visitors | Visitors are a class with a specific job to do. They are carried around the Standard Tree by a traverser which stops at each node where, if it is a node in which it is interested, the Visitor will do its job. |

The invention claimed is:

1. A method of transforming code to a different programming language, the method comprising:
   receiving the code;
   creating an abstract syntax tree based on the executable code;
   storing on a data store identification data on a plurality of re-structuring processes to be run on the abstract syntax tree to re-structure the tree to aid the transformation of the code to the different language;
   automatically running the re-structuring processes identified in the data store on the abstract syntax tree;
   automatically running a deployment process on the restructured tree to transform the code to the different programming language;
   assessing the transformed code and based on this assessment identifying a further re-structuring processes to be run on the abstract syntax tree to aid the transformation of the code to the different language;
   storing on the data store identification data of the further re-structuring process; and
   repeating the running steps.

2. A method according to claim 1, wherein the method further comprises receiving a data dictionary, meta data, or any other documentation that related to the received code.

3. A method according to claim 1, wherein the abstract syntax tree is created according to the steps of:
   receiving the executable code;
   identifying each executable segment of the code;
   assigning each executable segment of the code a node, wherein each node is one of a set of predetermined nodes types that each define a unique generic executable operation of programming languages, the structure and content of each node is determined by the generic operation that the node type defines; and
   linking nodes to create the tree.

4. A method according to claim 1, wherein the method further comprises the step of storing the abstract syntax tree in the data store.

5. A method according to claim 4 wherein the step of creating the abstract syntax tree further comprises extracting declarative elements from the abstract syntax tree and storing it to a data store.

6. A method according to claim 5, wherein the declarative elements are extracted from the abstract syntax tree using a plurality of mining processes that mine the abstract syntax tree to identify declarative elements in the tree.

7. A. method according to claim 5, wherein attributes of each of the declarative elements are stored in the data store.

8. A method according to claim 4, wherein the method further comprises storing in the data store analytical data on how and where elements of the code are used.

9. A method according to claim 4, wherein the method comprises the step of storing to the data store metadata about the code.

10. A method according to claim 9, wherein the metadata includes one or more of:
    information about the original language of the code and/or the different programming language;
    "built-in" components of the original language of the code and/or the different programming language; and
    information on restructuring such as the required maintainability, run time complexity and efficiency of the transformed code.

11. A method according to claim 9, wherein one or more parts of the metadata are extracted from the abstract syntax tree using a plurality of mining processes.

12. A method according to claim 1, wherein the restructuring processes include one or more of the following:
    a process to identify loops and restructure to the desired loop architecture;
    a process to identify particular executable statement and restructure to more sophisticated architecture;
    a process to identify GOTO statements in the abstract syntax tree and restructure tree to remove them;
    a process to identify duplicated sets of nodes in the tree and restructure to create the set of nodes as a function or procedure;
    a process to identify the scope of one or more variables;
    a process to identify a particular set of nodes in the abstract syntax tree and rearrange the structure of those nodes;
    a process to identify a particular set of nodes in the abstract syntax tree and replace the nodes, such as with a function call;
    a process to change the data structure into third normal form;

a process to walk the tree to identify interfaces; and a process to walk the tree and analyse the use of a variable to refine the variable type.

13. A method according to claim 1, wherein the method further comprises writing the re-structuring process to be run on the abstract syntax tree.

14. A method according to claim 4, wherein the method further comprises performing an audit of the information stored in the data store to identify whether information is missing.

15. A method according to claim 1, wherein the step of automatically running the re-structuring processes identified in the data store also use declarative information and metadata information about the code stored to the datastore.

16. A method according to claim 1, wherein two or more of the re-structuring processes are run simultaneously.

17. A method according claim 4, wherein the step of automatically running the deployment process also uses information about the code stored to the datastore.

18. A method according to claim 1, wherein the assessment of the transformed code is based on an assessment of any one or more of:
   cyclomatic complexity of the code;
   number of lines of code;
   number of processes that have been replaced;
   manual assessment of the transformed code; and
   accuracy of the deployed code.

19. A method according to claim 1, wherein the step of assessing the transformed code is based on the abstract syntax tree.

20. A method according to claim 1, wherein the assessment of the transformed code includes the generation of exception reports that identify parts of the transformed code that potentially may not produce the result required.

21. A method according to claim 4, wherein before assessing the transformed code, the method includes the step of storing the transformed code in the data store.

22. A method according to claim 21, wherein this involves replacing the transformed code of a previous iteration of the method with the newest version of the transformed code.

23. A method according to claim 4, wherein the data store is the one data store.

24. Application software able to perform the method according to claim 1.

25. A computer system for transforming code, the computer system having:
   input means to receive the code;
   storage means to store the received code and application software; and
   processing means to use the application software to perform the method of claim 1.

26. A computer system according to claim 25, wherein the computer system further comprises a data source to store the abstract syntax tree.

* * * * *